(12) United States Patent
Sherman et al.

(10) Patent No.: US 9,981,594 B2
(45) Date of Patent: May 29, 2018

(54) CAMERA BASED HEADLIGHT CONTROL SYSTEM

(71) Applicant: Gentex Corporation, Zeeland, MI (US)

(72) Inventors: Tom B. Sherman, Ada, MI (US); Jim L. Schneider, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days. days.

(21) Appl. No.: 15/486,973

(22) Filed: Apr. 13, 2017

(65) Prior Publication Data

US 2017/0297478 A1 Oct. 19, 2017

Related U.S. Application Data

(60) Provisional application No. 62/322,409, filed on Apr. 14, 2016.

(51) Int. Cl.
*G06K 9/00* (2006.01)
*B60Q 1/10* (2006.01)
*B60Q 1/00* (2006.01)

(52) U.S. Cl.
CPC ............. *B60Q 1/10* (2013.01); *B60Q 1/0023* (2013.01); *G06K 9/00791* (2013.01); *B60Q 2300/324* (2013.01)

(58) Field of Classification Search
CPC .. B60Q 1/0023; B60Q 1/10; B60Q 2300/324; G06K 9/00791
USPC ......................................................... 382/100
See application file for complete search history.

(56) References Cited

U.S. PATENT DOCUMENTS

| 8,045,760 | B2 | 10/2011 | Stam et al. |
| 8,065,053 | B2 | 11/2011 | Stam et al. |
| 8,543,254 | B1 | 9/2013 | Schut et al. |
| 8,577,169 | B2 | 11/2013 | Andrus et al. |
| 8,924,078 | B2 | 12/2014 | Jeromin et al. |
| 2012/0200224 | A1* | 8/2012 | Schofield ............. B60Q 1/1423 315/79 |
| 2014/0015972 | A1 | 1/2014 | Hoek et al. |
| 2015/0048738 | A1 | 2/2015 | Falb |

OTHER PUBLICATIONS

International Search Report and Written Opinion of the International Searching Authority, or the Declaration, dated Aug. 17, 2017, for International Application No. PCT/US2017/027432, filed Apr. 13, 2017, 9 pages.

* cited by examiner

*Primary Examiner* — Manuchehr Rahmjoo
(74) *Attorney, Agent, or Firm* — Price Heneveld LLP; Bradley D. Johnson (57) ABSTRACT

A lighting system for a vehicle is disclosed. The lighting system comprises an imager configured to capture image data in a plurality of image frames in a rearward field of view. The system further comprises at least one headlamp configured to output an emission of light at a plurality of elevations and a controller. The controller is in communication with the imager and the headlamp. The controller is operable to process the image data to identify features in a first frame and a second frame. The controller is further operable to identify a movement of the features from the first frame to the second frame and adjust the elevation of the output emission in response to the movement.

10 Claims, 5 Drawing Sheets

CAMERA BASED HEADLIGHT CONTROL SYSTEM

CROSS REFERENCE TO RELATED APPLICATION

This application claims priority to and the benefit under 35 U.S.C. § 119(e) of U.S. Provisional Patent Application No. 62/322,409, filed on Apr. 14, 2016, entitled "REAR CAMERA BASED HEADLIGHT CONTROL SYSTEM," the entire disclosure of which is hereby incorporated herein by reference.

TECHNICAL FIELD

The present disclosure generally relates to a lighting system for a vehicle and more particularly to a headlight system adjusted based on a field of view relative the vehicle.

SUMMARY

According to one aspect of the present disclosure, a lighting system for a vehicle is disclosed. The lighting system comprises an imager configured to capture image data in a plurality of image frames in a rearward field of view. The system further comprises at least one headlamp configured to output an emission of light at a plurality of elevations and a controller. The controller is in communication with the imager and the headlamp. The controller is operable to process the image data to identify features in a first frame and a second frame. The controller is further operable to identify a movement of the features from the first frame to the second frame and adjust the elevation of the output emission in response to the movement.

According to another aspect of the disclosure, a lighting system for a vehicle is disclosed. The system comprises an imager configured to capture image data in a plurality of image frames in a field of view rearward relative to the vehicle and at least one headlamp configured to output an emission of light at a plurality of elevations. A controller is in communication with the imager and the headlamp. The controller is configured to process the image data identifying at least one feature in a first frame and a second frame of the plurality of image frames and identify a movement of the feature from the first frame to the second frame. The controller is further configured to adjust the elevation of the output emission in response to the movement.

According to yet another aspect of the disclosure, a lighting system for a vehicle is disclosed. The system comprises an imager configured to capture image data in a plurality of image frames in a field of view rearward relative to the vehicle. The system further comprises a first headlamp configured to emit a first emission and a second headlamp configured to emit a second emission. Each headlamp is configured to emit light at a plurality of elevations. A controller is in communication with the imager and the headlamp. The controller is operable to process the image data to identify at least one feature in a first frame and a second frame of the plurality of image frames and identify a feature movement based on a pixel shift of the at least one feature from the first frame to the second frame. The controller is configured to identify vehicle movement as a rotational movement based on the pixel shift in the image data and adjust a first elevation of the first emission and a second elevation of the second emission independently in response to rotational movement.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 1:
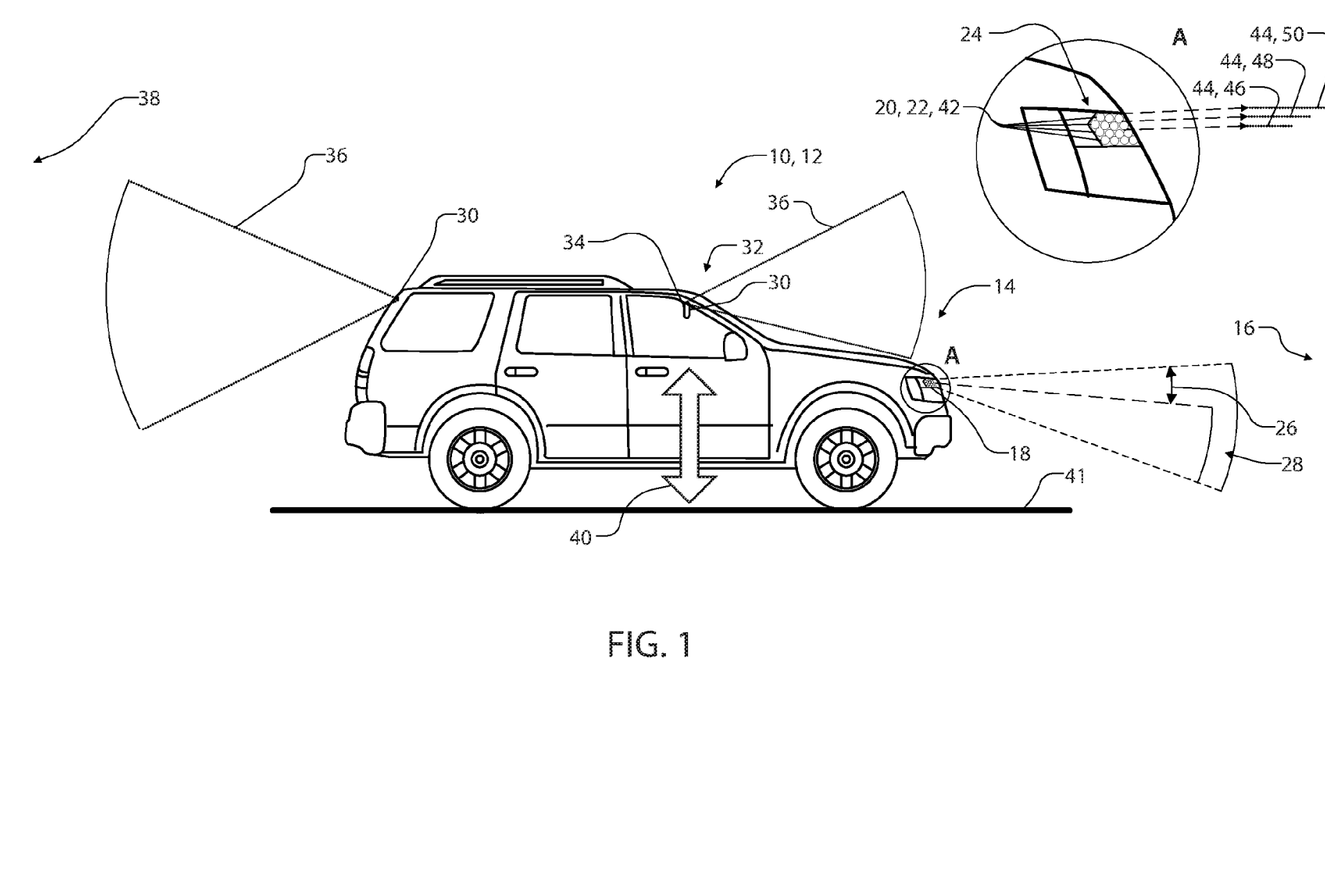
FIG. 1 is a side view of a vehicle demonstrating a vehicle lighting system.

Referring to FIG. 1 a vehicle 10 is shown equipped with a lighting system 12. In an exemplary embodiment, the lighting system 12 may correspond to a headlight system 14 configured to illuminate a forward region 16 relative the vehicle. The headlight system 14 may comprise at least one headlamp 18 configured to selectively emit light from a plurality of lighting portions 20. The lighting portions 20 may correspond to a plurality of light emitting sources 22. In some embodiments, the plurality of light emitting sources may correspond to a matrix 24 of light emitting sources as demonstrated in Detail A. In this configuration, the headlight system 14 may be configured to control a vertical level 26 or elevational level of an emission 28 of light projected from the at least one headlamp 18.

In some embodiments, the lighting system 12 may comprise a controller configured to control the vertical level 26 of the emission 28 based on image data captured by an imager 30. The imager 30 may correspond to a rearward directed image sensor. Though discussed in reference to a rearward directed image sensor, the imager 30 may be directed in a variety of directions in reference to a forward operating direction of the vehicle 10. For example, the imager may be directed forward and substantially aligned with the forward operating direction of the vehicle 10. In some embodiments, the imager 30 may form a component of a rearview imaging system 32 configured to display image data on a rearview display 34. As such, the imager 30 may form a component of a rearview imaging system 32 and may share various processing components and/or communication interfaces with the lighting system 12.

The controller of the lighting system 12 may be configured to receive the image data captured by the imager 30 to detect an ego motion of the vehicle 10. The image data may correspond to a field of view 36 captured by the imager 30. In an exemplary embodiment, the imager 30 may be configured to capture image data in a field of view demonstrating a scene 38 rearward of the vehicle 10. Accordingly, the controller may be configured to detect a vertical movement 40 of the vehicle 10 relative to a roadway surface 41 based on the image data of the scene 38. The controller may then utilize the vertical movement 40 detected from the image data to control the vertical level 26 of the at least one headlamp 18. Further details regarding the controller of the lighting system are discussed in reference to FIG. 4.

As demonstrated in Detail A, the lighting portions 20 are shown as a plurality of rows 42 of the light emitting sources 22 that form the matrix 24. Each of the lighting portions 20 may correspond to one or more of the rows 42 of the light emitting sources 22. As discussed herein, the controller may control the vertical level 26 of the at least one headlamp 18 by selectively activating each of the lighting portions 20 to output the emission 28 at a plurality of elevations 44. For example, the controller may selectively activate each of the lighting portions 20 to adjust the elevation 44 among a first vertical level 46, a second vertical level 48, and a third vertical level 50. In this way, the controller may rapidly control the elevation 44 of the emission 28 in response to the vertical movement 40 of the vehicle 10. Though discussed as three vertical levels 46, 48, and 50, the levels of the vertical zones may vary based on the characteristics of a wide range of lighting systems without departing from the spirit of the disclosure.

Figure 2:
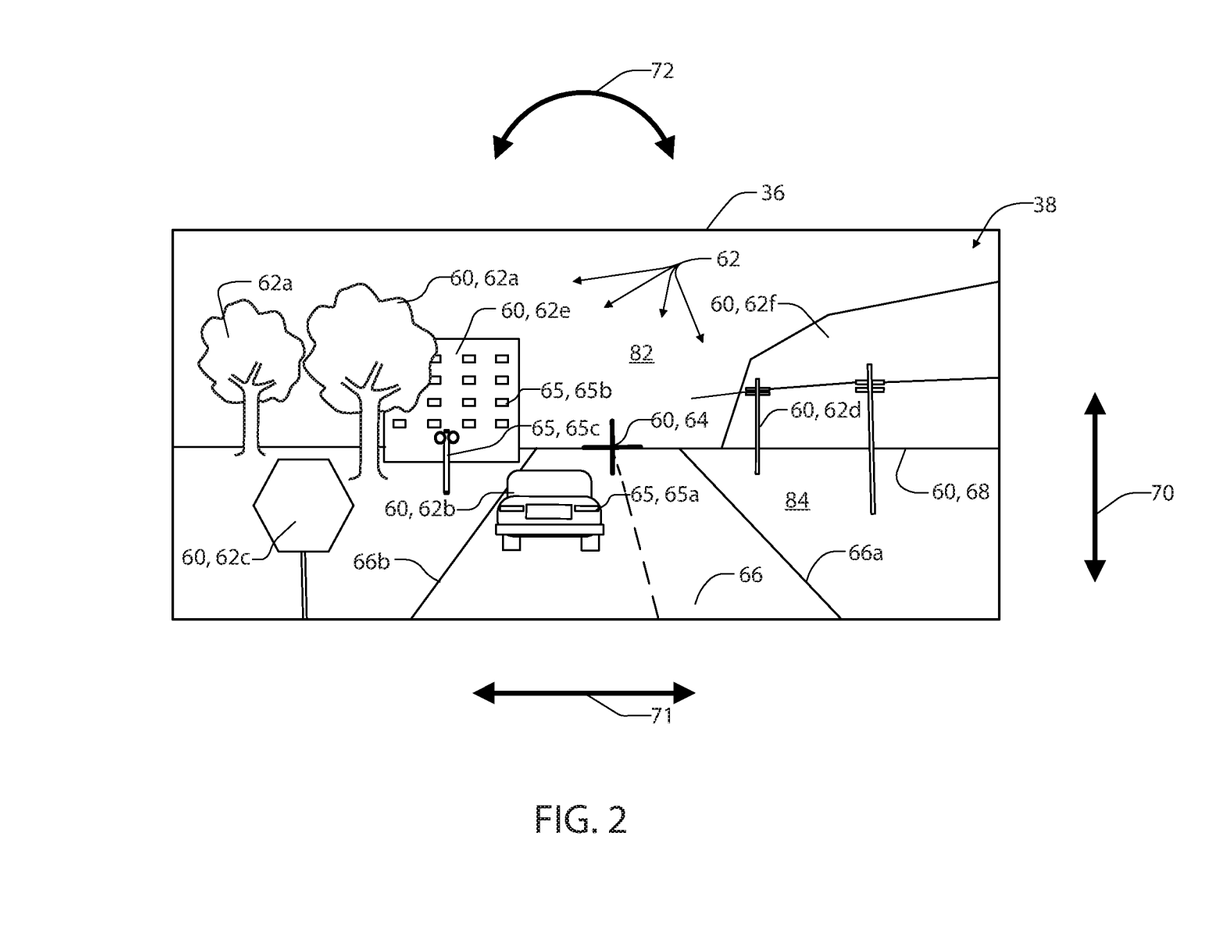
FIG. 2 is a diagram of image data corresponding to a scene captured by an rearview imager of a lighting system.

Referring now to FIG. 2 the field of view 36 of the image data of the scene 38 captured by the imager 30 is shown. Based on the image data, the controller may detect various reference features 60 that may be compared over time to detect the vertical movement 40 of the vehicle 10. The reference features 60 may correspond to edges or groups of edges of various objects 62 that may be detected by one or more image processing algorithms. Additionally the controller may be operable to detect a variety of features that may commonly be identifiable in the scene 38. For example, the controller may detect at least one of a vanishing point 64 of a road 66, a horizon 68, and a variety of features that may be identified in the image data. Based on the locations of the objects 62 and/or features detected in the image data, the controller may determine the vertical movement 40 of the vehicle 10 and control the vertical levels 46, 48, and 50 of the at least one headlamp 18 to limit an apparent movement or variation in the elevation 44 of the emission 28. The apparent movement may correspond to a rapid bounce, jerk, or other rapid elevational variation in the position or orientation of the vehicle 10.

As shown in FIG. 2, the objects may correspond to various types of objects that may commonly be identified proximate roadways. For example, the objects 62 may correspond to a natural feature 62a (e.g. a tree, shrub, vegetation, etc.), a trailing vehicle 62b, a sign 62c, a utility pole 62d, a building 62e, a landscape feature 62f, etc. Though specific objects 62 and/or features are discussed that may be utilized as reference features 60 to identify the vertical motion 40 of the vehicle 10, various objects that may be located proximate a motorway may be similarly identified. Accordingly, the disclosure provides for a flexible solution to provide for the identification of one or more objects 62 and/or features to assist in identifying the vertical movement 40 of the vehicle 10.

In some embodiments, one or more of the objects may correspond to objects that emit light and are visible during nighttime or other low lighting conditions. For example, one or more of the objects may correspond to light sources 65 detected in the image data. As shown, the light sources 65 may correspond to a headlight 65a or taillight of a vehicle (e.g. the vehicle 62b) captured in the field of view 36. Additionally, the light source may correspond to one or more building lights 65b, street lights 65c, utility lights or a variety of light sources that may be detected proximate the road 66. In this way, the controller of the lighting system 12 may be configured to receive the image data captured by the imager 30 to detect an ego motion of the vehicle 10.

For example, the controller may identify a vertical shift 70 of the vanishing point 64 in the image data among two or more image frames of the image data to identify the vertical movement 40 of the vehicle 10. Similarly, the controller may detect the vertical shift 70 of the horizon 68 to identify the vertical movement 40. The vertical movement 40 of the vehicle 10 may be identified as a pixel shift of one or more edges of the references features 60 and/or objects 62 or features detected in the image data at a calibrated distance. The calibrated distance may be based on a known or previously calibrated focal length of the imager 30. In this configuration, the controller may process the image data to identify a magnitude of the vertical movement 40 or other movement of the vehicle 10 to accurately control the elevation 44 of the emission 28.

In operation, the controller may identify a pixel shift of the at least one feature 60 and/or objects 62 in the image data over a plurality of image frames. Based on the pixel shift, the controller may calculate a magnitude of a movement of the vehicle 10. The controller may identify the magnitude of the movement of the vehicle 10 by comparing a distance of the pixel shift in the field of view 36 of the imager 30 to a calibrated distance of the focal length of the imager 30. Based on the comparison, the controller may identify the magnitude of the movement of the vehicle 10 and adjust the elevation 44 or level of the at least one headlamp 18 to compensate for the movement of the vehicle 10 and prevent a corresponding movement of the emission 28.

Figure 3:
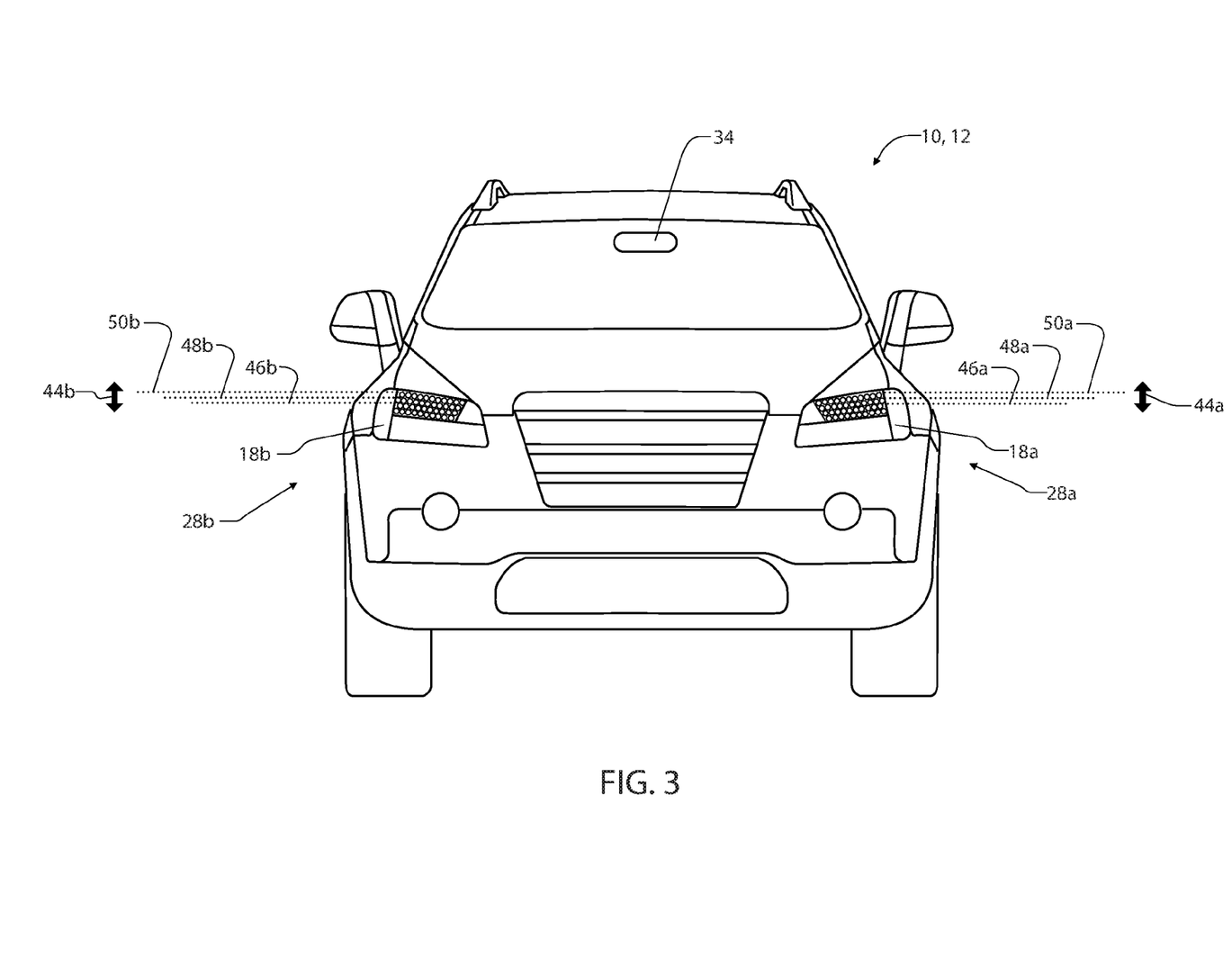
FIG. 3 is a front view of a vehicle demonstrating a vehicle lighting system.

Referring now to FIGS. 2 and 3 in some embodiments, the emission 28 may correspond to a first emission 28a of a first headlamp 18a and a second emission 28b of a second headlamp 18b. The first headlamp 18a may correspond to a driver-side headlamp and the second headlamp 18b may correspond to a passenger-side headlamp. In such a configuration, the controller may be configured to control a first elevation 44a of the first headlamp 18a independent of a second elevation 44b of the second headlamp 18b based on the image data. For example, the controller may identify a rotational shift 72 based on a rotational motion (e.g. an angular change in position) of the horizon 68 and/or a rotation of one or more edges or objects identified in a plurality of frames of the image data. Accordingly, the controller may be configured to activate the first headlamp 18a to emit the first emission 28a at a plurality of vertical levels 46*a*, 48*a*, and 50*a* independent of the control of the second headlamp 18*b*. Additionally, the controller may be configured to activate the second headlamp 18*b* to emit the second emission 28*b* at a plurality of vertical levels 46*b*, 48*b*, and 50*b* independent of the control of the first headlamp 18*a*.

For example, in response to detecting a clockwise shift in the plurality of objects and/or the horizon 68, the controller may adjust the first elevation 44*a* of the first headlamp 18*a* upward and the second elevation 44*b* of the second headlamp 18*b* downward. Similarly in response to a counter-clockwise shift, the controller may adjust the first elevation 44*a* of the first headlamp 18*a* downward and the second elevation 44*b* of the second headlamp 18*b* upward. More specifically, in response to an upward shift on the driver-side identified in the image data, the controller may adjust the first elevation 44*a* of the first headlamp 18*a* downward. That is, in order to compensate for the upward shift in the image data, the controller may lower the first elevation 44*a* to avoid blinding oncoming traffic. In response to a downward shift on the passenger-side identified in the image data, the controller may adjust the second elevation 44*b* of the second headlamp 18*b* upward. In order to compensate for the downward shift in the image data, the controller may lower the second elevation 44*b* to avoid losing the effective projection distance of the second emission 28*b*.

As discussed herein, a vertical shift 70, horizontal shift 71, and/or rotational shift 72 of the one or more objects 62 or features may be identified in the image data by comparing a first position of an edge or object in a first image to a second position of the edge or object in a second image frame. The subsequent or second image frame may correspond to an image frame captured by the imager 30 after a temporal period has passed from the capture of the first image frame. In this configuration, the response time of the controller to detect the movement of the one or more objects 62 or features may be at least partially dependent on a frame rate of the imager 30 and a processing speed of the controller.

In some embodiments, the lighting system 12 may be configured to reduce the effects of one or more delays in a response time between identifying the vertical movement 40 of the vehicle 10 and adjusting the vertical level 26 of the at least one headlamp 18. Some potential sources of delay may be related to one or more steps of image acquisition by the imager 30 or image processing by the controller. Additionally, a delay may be caused by messaging or communications from the imager 30 to the controller (e.g. communication via a vehicle bus or can-bus), etc. Accordingly, the lighting system may utilize one or more prediction methods to identify the vertical movement based on the vertical shift 70 or other movement identified in the image data.

A prediction method that may be utilized by the controller may correspond to the application of one or more predictive filters. The predictive filters may be applied to predict a future elevation for the emission 28 for an elevation adjustment at a future time. The future elevation may be predicted based on a plurality of previously identified inter-frame movements of objects 62 identified in the image data. Based on the inter-frame movements, the future elevation of the emission 28 can be predicted based on one or more previously identified motion vectors for the objects 62 identified in the image data. In this way, the controller may estimate the future elevation of the emission such that the system 12 can adjust the elevation 44 based on an anticipated or future vertical movement 40 of the vehicle 10. Accordingly, the system may be configured to adjust a current elevation of the output emission 28 to a future, anticipated elevation in response to an anticipated vertical movement of the vehicle 10.

For example, an adaptive linear prediction filter may be applied to the results of a headlight aim adjustment step to adjust the elevation of the emissions from the headlamps 18*a* and 18*b*. In this way, the system 12 may be operable to predict the future elevation of the output emissions 28*a* and 28*b* to prevent the appearance of a delay in a system response of the lighting system 12. The delay may be a response to time required by the system 12 to capture the image data, process the image data, or a response time of the at least one headlamp 18 to control the elevation of the emission 28. The headlight aim adjustment step is further discussed in reference to FIG. 4 as step 100. As discussed herein, the controller may predict the output for future adjustments of the headlamps 18*a* and 18*b* based on an amount of fixed static delay. As such, the lighting system 12 may reduce errors related to one or more delays as discussed herein.

The controller may be configured to utilize various algorithms and methods to identify features in the image data. For example, the controller may be configured to utilize an adaptive edge detection process to identify the lanes and portions of the road 66 in order to identify the vanishing point 64 or horizon 68. Additionally, the controller may be configured to utilize a boundary contrast algorithm to detect the horizon 68 by detecting a gradient threshold of a series of pixel values of the image data. Though particular image processing methods are discussed herein, the methods are introduced for explanation and not limitation. As such, the disclosure shall not be limited to such exemplary embodiments unless expressly stated otherwise.

The adaptive edge detection process may utilize an edge detection mask to approximate a gradient at pixel locations in the image data. If a pixel meets predetermined criteria for an intensity value and a gradient threshold value, the controller may identify the pixels as a candidate lane line pixels. As the image data corresponding to a current frame captured by the imager 30 is processed, the candidate lane line pixels are utilized to generate a best-fit polynomial to model a lane line of the road 66. In some embodiments, the best-fit polynomial may correspond to a third order polynomial. In this way, the candidate lane line pixels may be utilized to generate a left lane line model 66*a* and a right lane line model 66*b*, which may correspond to sides of the road 66. The left lane line model 66*a* and the right lane line model 66*b* model may be used to determine the intersection point of the sides of the road 66, which may correspond to the vanishing point 64 in the image data.

The controller may utilize the horizon boundary contrast algorithm to detect groups of pixels in the image data in order to identify the horizon 68. Each of the groups of pixels may correspond to portions or patches of contiguous pixels in the image data that contain the boundary between a sky portion 82 and a ground portion 84 of image data. The horizon boundary contrast algorithm may analyze the contrast between the sky portion 82 and the ground portion to determine a location of the horizon 68. The contrast may be analyzed by calculating a pixel intensity vertically in the image data to determine a vertical gradient. The vertical gradient captures the difference in intensity or pixel values of the pixels corresponding to the sky portion 82 and those corresponding to the ground portion 84. By identifying the boundary of the sky portion 82 and the ground portion 84, the controller may be operable to identify the horizon 68 in the image data.

In some embodiments, an object flow process may be utilized to identify the vertical shift 70, horizontal shift 71, and/or rotational shift 72. The object flow detection method may be processed by the controller by identifying an expected motion of the objects 62 based on a velocity of the vehicle and/or a trend in the motion of the objects 62. For example, the objects 62 in a sequence of image frames captured by the imager 30 may trend toward a vanishing point of the field of view 36. Accordingly, a variation in the optical flow or object flow contrary to the trend based on the velocity of the vehicle may be identified by the controller to adjust the elevation of the emission 28.

Systems demonstrating various detection techniques that may be implemented in the lighting system 12 are further discussed in detail in U.S. Pat. No. 9,767,695 entitled "STAND ALONE BLIND SPOT DETECTION SYSTEM," filed on Jul. 11, 2013, by Steven G. Hoek et al.; U.S. Pat. No. 8,924,078, entitled "IMAGE ACQUISITION AND PROCESSING SYSTEM FOR VEHICLE EQUIPMENT CONTROL," filed on Oct. 17, 2011, by Oliver M. Jeromin et al.; U.S. Pat. No. 8,577,169, entitled "DIGITAL IMAGE PROCESSING AND SYSTEMS INCORPORATING THE SAME," filed on Feb. 1, 2010, by Jeremy C. Andrus et al.; U.S. Pat. No. 8,065,053 B2, entitled "IMAGE ACQUISITION AND PROCESSING SYSTEMS FOR VEHICLE EQUIPMENT CONTROL," filed on Jan. 31, 2011, by Joseph S. Stam et al.; and U.S. Pat. No. 8,543,254 B1, entitled "VEHICULAR IMAGING SYSTEM AND METHOD FOR DETERMINING ROADWAY WIDTH," filed Mar. 28, 2012, by Jeremy A. Schut et al., which are incorporated by reference herein in their entirety.

Figure 4:
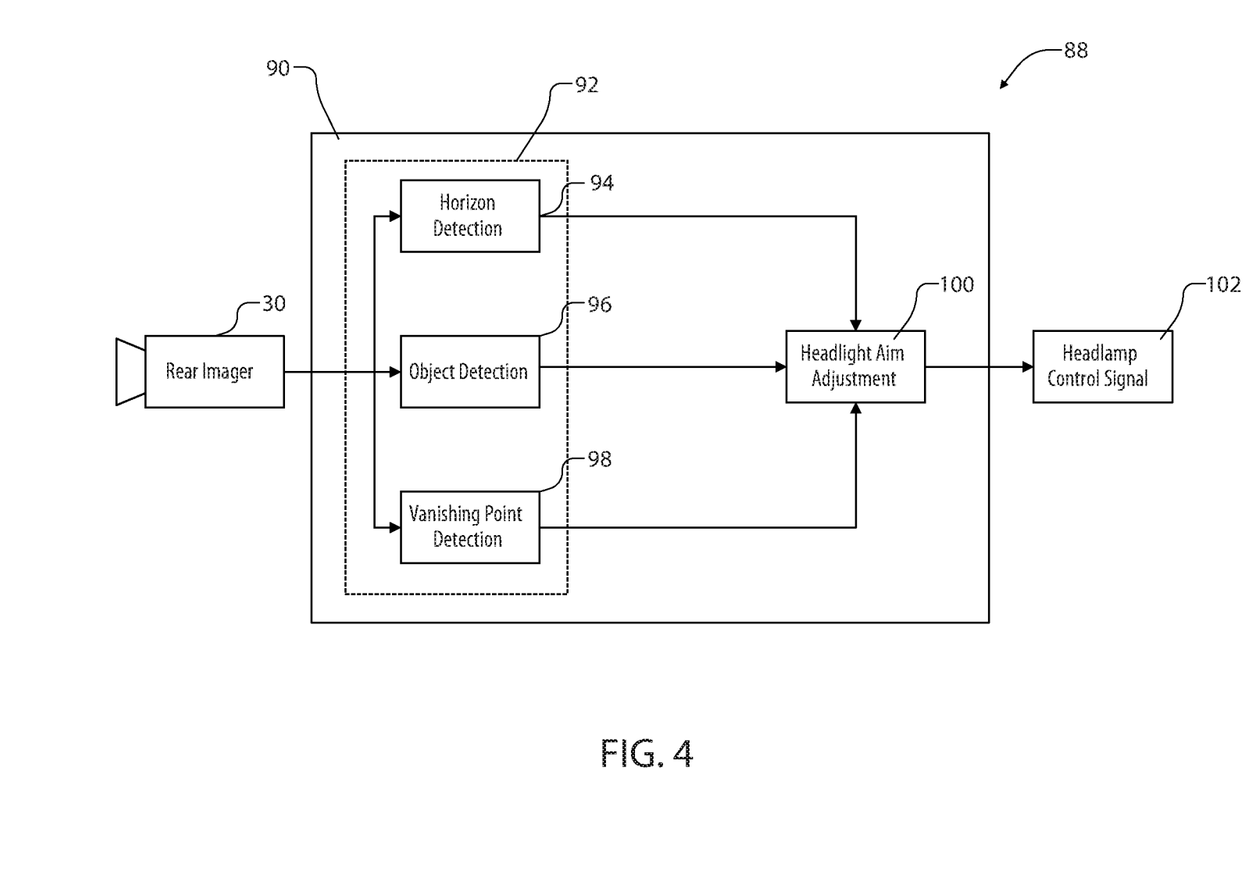
FIG. 4 is a process diagram demonstrating a method of adjusting a level of the headlights based on the image data.

Referring now to FIG. 4, a process diagram 88 is shown demonstrating a method to adjust the one or more elevations 44 of the emission 28 from the one more headlamps discussed 18 herein. The method may begin by capturing the image data via the imager 30 and communicating the image data to the controller 90. At least one processor of the controller 90 may be configured to complete one or more image processing steps 92 on the image data to determine the vanishing point 64, the horizon 68, or any other features 60 or objects 62 detected that may be identified in the image data. The features 60 or objects 62 identified in the image data may be utilized by the processor to identify at least one of the horizontal shift 71, the vertical shift 70, and the rotational shift 72 image data.

The one or more image processing steps 92 may include a horizon detection step 94, an object detection step 96 and a vanishing point detection step 98. Based on the features identified by the processor in the image processing steps 92, the processor may be operable to generate one or more offsets that may be applied in a headlight aim adjustment step 100 to adjust the elevation of the emissions 28 from the headlamps 18a and 18b. The one or more processors may comprise one or more modules configured to identify shifts in the features and/or objects 62 detected in the image data to adjust the elevation 44 of the emissions 28 and correct or compensate for a rapid or jerking vertical movement 40 or other similar rapid movement of the vehicle 10.

The horizon detection step 94 may be configured to detect the horizon 68 in a plurality of image frames of the image data. Based on a change in the vertical position and/or an angle of the horizon 68, the controller may be operable to determine the vertical offset 70 and/or the rotational offset 72. Similarly, the object detection step 96 may be configured to identify the movement of one or more objects 62 and/or corresponding edges in a plurality of image frames of the image data to determine the vertical offset 70 and/or the rotational offset 72. Additionally, the controller 90 may utilize the vanishing point detection step 98 to determine at least the vertical offset 70. In this way, the controller 90 may identify a movement of the features and/or objects in the image data to generate a headlamp control signal 102 to control one or more elevations 44 of the emission 28.

In some embodiments, the controller 90 may further be configured to apply one or more signal conditioning steps to the headlight aim adjustment step 100. For example, in some cases a slow movement of one or more objects in the image data (e.g. the horizon 68) over a number of frames may correspond to gradual changes in the scene 38 over time. Such changes may not correspond to vertical movement 40 of the vehicle 10 related to bumps in the roadway surface 41 or other factors that may affect the vertical level 26 of the at least one headlamp 18 as discussed herein. Accordingly, the controller 90 may apply one or more filters to condition the data from the imager 30, such as a high pass filter. At least one example of a high pass filter may include a filter configured to attenuate frequencies of motion data in the image data ranging from a constant or zero frequency to a level substantially below a resonance frequency of the a suspension of the vehicle 10. In this way, the controller 90 attenuate data related to gradual changes in the scene 38.

Figure 5:
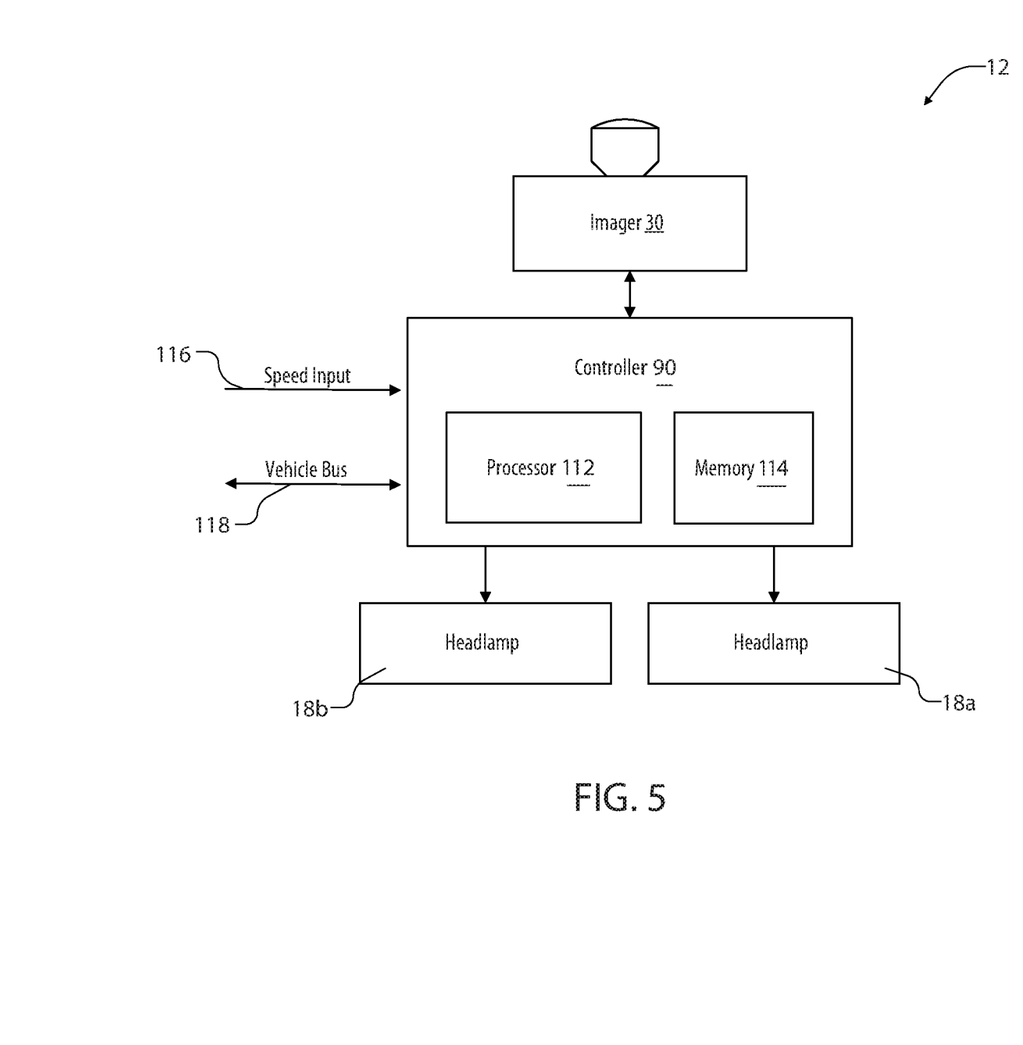
FIG. 5 is a block diagram of the headlight system in accordance with the disclosure.

Referring now to FIG. 5, a block diagram of the lighting system 12 is shown. The imager 30 is shown in communication with the controller 90. A pixel array of the imager 30 may correspond to a CMOS image sensor, for example a CMOS active-pixel sensor (APS) or a charge coupled device (CCD). Each of the pixels of the pixel array may correspond to a photo-sensor, an array of photo-sensors, or any grouping of sensors configured to capture light. The controller 90 may comprise a processor 112 operable to process the image data as supplied in analog or digital form in the imager 30. For example, the controller 90 may be implemented as a plurality of processors, a multicore processor, or any combination of processors, circuits, and peripheral processing devices. The processor 112 may comprise a plurality of modules configured to process the image data.

The controller 90 may further comprise a memory 114. The memory 114 may correspond to various forms of memory, for example, random access memory (RAM), dynamic RAM (DRAM), synchronous DRAM (SDRAM), and other forms of memory configured to store information. The memory 114 may be configured to store the image data for processing. Processing the image data may comprise various edge detection and/or object detection steps as discussed herein. The memory may be configured to store various algorithms, processing instructions, method steps, etc. to identify the vertical movement 40 and adjust the one or more elevations 44 of the emission 28.

The controller 90 may be in communication with a plurality of inputs for example, a speed input 116 and a vehicle bus 118. The speed input 116 may provide a signal communicating a speed of the vehicle 10 via a speedometer or any device operable to measure and communicate data corresponding to the speed of a vehicle 10. The vehicle bus 118 may be implemented using any suitable communication bus, such as a Controller Area Network (CAN) bus. The vehicle bus 118 may also be configured to provide a variety of additional information to the controller 90.

Based on the image data and the various processing steps discussed herein, the controller 90 may be configured to control the elevation 44 of the at least one headlamp 18 in response to the vertical movement 40 of the vehicle 10. In some embodiments, the controller 90 may be configured to adjust the elevation 44 of the emission 28 among a plurality of levels. For example, the controller 90 may be configured to activate the first headlamp 18a to emit the first emission 28a at a plurality of vertical levels 46a, 48a, and 50a independent of the control of the second headlamp 18b. Additionally, the controller 90 may be configured to activate the second headlamp 18b to emit the second emission 28b at a plurality of vertical levels 46b, 48b, and 50b independent of the control of the first headlamp 18a.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A lighting system for a vehicle comprising:
   an imager configured to capture image data in a plurality of image frames in a field of view rearward relative to the vehicle;
   at least one headlamp configured to output at least one emission of light at a plurality of elevations; and
   a controller in communication with the imager and the at least one headlamp, wherein the controller is operable to:
   process the image data identifying at least one feature in a first frame and a second frame of the plurality of image frames;
   identify a feature movement based on a pixel shift of the at least one feature from the first frame to the second frame;
   calculate a magnitude of a vehicle movement based on the pixel shift in the image data of the at least one feature in the image data; and
   adjust the elevation of the output emission in response to the vehicle movement,
   wherein a magnitude of the vehicle movement is calculated based on a comparison of the pixel shift to a focal length of the imager.

2. The lighting system according to claim 1, wherein the at least one head lamp corresponds to a first headlamp configured to output a first emission and a second headlamp configured to output a second emission.

3. The lighting system according to claim 2, wherein the controller is configured to adjust the elevation of a first output emission of the first headlamp independently from a second output emission of the second headlamp in response to the movement.

4. The lighting system according to claim 3, wherein the controller is configured to identify vehicle movement as a rotational movement relative to a forward direction of the vehicle based on the pixel shift in the image data.

5. The lighting system according to claim 4, wherein the controller is configured to adjust the elevation of the first emission in a first direction and the elevation of the second output emission in a second direction in response to rotational movement.

6. The lighting system according to claim 4, wherein the first direction is upward in elevation and the second direction is downward in elevation.

7. The lighting system according to claim 1, wherein the at least one headlamp comprises a plurality of light emitting sources arranged in a matrix.

8. The lighting system according to claim 1, wherein the controller is configured to identify the pixel shift based on a change in contrast between a sky portion and a ground portion indicating a horizon.

9. The lighting system according to claim 1, wherein the controller is configured to identify the pixel shift based on a change in the motion of the at least one feature from a motion trend identified in the plurality of image frames.

10. The lighting system according to claim 1, wherein the controller is configured to filter the feature movement to remove low frequency content corresponding to gradual changes in an operating direction of the vehicle.

* * * * *